UNITED STATES PATENT OFFICE.

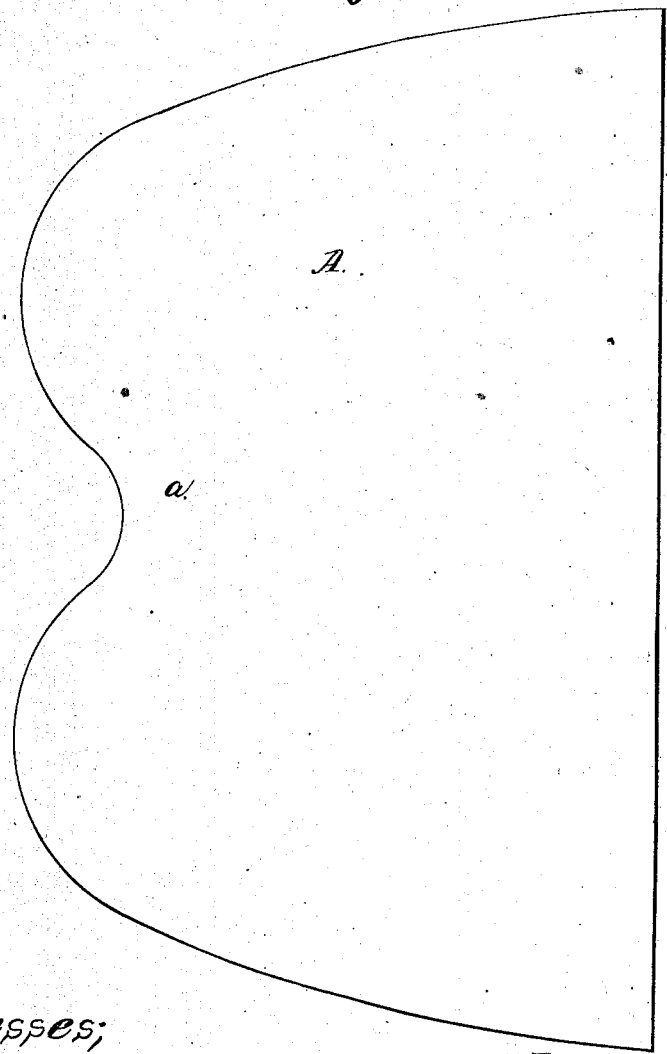

H. C. ROGERS, OF SCRANTON, PENNSYLVANIA.

IMPROVEMENT IN HOES.

Specification forming part of Letters Patent No. 35,627, dated June 17, 1862.

*To all whom it may concern:*

Be it known that I, H. C. ROGERS, of Scranton, in the county of Luzerne and State of Pennsylvania, have invented a new and Improved Hoe; and I do hereby declare that the following is a full, clear, and exact description of the same, reference being had to the accompanying drawings, making a part of this specification, in which—

Figure 1 represents a longitudinal vertical section of my invention. Fig. 2 is a plan or top view of the same.

Similar letters of reference in both views indicate corresponding parts.

This invention consists of a hoe composed of a plate of iron and a plate of steel, welded together in such a manner that the two metals form a self-cutting edge.

To enable those skilled in the art to make and use my invention, I will proceed to describe its construction and operation with reference to the drawings.

My hoe A is made in the ordinary form and shape; and it consists of two plates, *a b*, one of iron and the other of steel, which are firmly united by welding. By these means I can produce a hoe which has manifest advantages both for the manufacturer and for the purchaser.

My hoes can be made cheaper than hoes entirely of steel, and in the solid-neck hoes they will be greatly superior, as the neck will be composed of iron and steel combined, thus giving great strength and stiffness and far less liability to break—a common fault of the solid cast-steel hoe.

In the manufacture of my hoes I can afford to put in a much better quality of steel, they being half iron, which will reduce the aggregate price for the stock, so that the use of good steel can be afforded; and, furthermore, the iron will so support and strengthen the steel that a pure quality of steel can be used, which can be properly tempered and will bear a keen edge. When a hoe is made entirely of steel it has to be made of a quality of low temper, like spring-steel, or it would crack and break easily both in tempering and in use, as the same has to be plated out so thin to make it light enough.

In using my hoe the soft iron wears away and a hard sharp steel edge is left prominent. The hoe therefore works easily in the hand of a farmer, and each stroke is sure to have the desired effect on weeds, &c.

It must be remarked that my hoe is self-sharpening. The iron wears away by the action of the ground on the hoe, leaving the hard steel edge prominent, and it differs in this particular from scythes and other cutting tools or instruments, which may be made by welding a plate of steel between two plates of iron. In this latter case the iron has to be removed by the action of the grinding-stone in order to produce a sharp edge. My hoe requires no sharpening on the stone, and its manufacture is considerably facilitated if the steel and iron are firmly welded together in the bar or bloom, which is then drawn out and rolled down to the requisite thickness for the hoe.

Having thus fully described my invention, what I claim as new, and desire to secure by Letters Patent as a new article of manufacture, is—

A hoe, A, composed of two plates, *a b*, one of iron and the other of steel, so united by welding them together that the two metals form the cutting-edge, for the purpose set forth.

H. C. ROGERS.

Witnesses:
JAMES NOLAN,
I. R. FORDHAM.